US005637232A

United States Patent [19]

Hayden

[11] Patent Number: 5,637,232
[45] Date of Patent: Jun. 10, 1997

[54] PROCESS FOR THE CATALYTIC OXIDATION OF FERROUS IRON IN LIQUID MEDIA

[75] Inventor: Richard A. Hayden, Pittsburgh, Pa.

[73] Assignee: Calgon Carbon Corporation, Pittsburgh, Pa.

[21] Appl. No.: 613,848

[22] Filed: Mar. 11, 1996

[51] Int. Cl.$^6$ .................................................. C02F 1/72
[52] U.S. Cl. ................................... 210/763; 210/912
[58] Field of Search ............................. 210/762, 763, 210/912, 688

[56] References Cited

U.S. PATENT DOCUMENTS

| | | | |
|---|---|---|---|
| 1,966,279 | 7/1934 | Behrman | 210/688 |
| 2,693,452 | 11/1954 | Goedkoop | 210/688 |
| 3,017,347 | 1/1962 | Kratz | 210/763 |
| 3,222,277 | 12/1965 | Joyce | 210/688 |
| 3,617,562 | 11/1971 | Cywin | 210/722 |
| 3,728,257 | 4/1973 | Fuxelius | 210/912 |
| 3,909,449 | 9/1975 | Nagai et al. | 252/422 |
| 4,361,486 | 11/1982 | Hou et al. | 210/722 |
| 4,496,664 | 1/1985 | Motojima | 210/688 |
| 4,534,867 | 8/1985 | Kreusch et al. | 210/772 |
| 4,624,937 | 11/1986 | Chou | 502/180 |
| 4,659,512 | 4/1987 | Macedo et al. | 210/688 |
| 4,789,475 | 12/1988 | Harte et al. | 210/912 |
| 4,902,427 | 2/1990 | Szczepanik | 210/912 |
| 4,985,150 | 1/1991 | Cronje et al. | 210/661 |
| 5,338,458 | 8/1994 | Carrubba et al. | 210/668 |
| 5,352,370 | 10/1994 | Hayden | 210/763 |

*Primary Examiner*—Cynthia L. Nessler
*Attorney, Agent, or Firm*—Titus & McConomy

[57] ABSTRACT

A improved process is provided for the catalytic oxidation of ferrous iron in liquid media in the presence of oxygen. The improvement is provided by the use of a carbonaceous char catalytically active for said oxidation which is prepared by the carbonization and oxidation of a bituminous coal or a bituminous material at temperatures below 700° C. followed by exposure of the carbonized, oxidized char to a nitrogen-containing compound and, during or after said exposure, increasing the temperature to at least 700° C.

6 Claims, No Drawings

PROCESS FOR THE CATALYTIC OXIDATION OF FERROUS IRON IN LIQUID MEDIA

FIELD OF THE INVENTION

The present invention relates to a process for the catalytic oxidation of ferrous iron to ferric iron in liquid media.

BACKGROUND OF THE INVENTION

Ferrous iron can occur as an unwanted constituent in a number of potable, process, or wastewater streams. For example, ferrous iron in parts-per-million concentrations is present in many potable water systems, and can cause a number of problems for the end-user. Such problems range from the staining of laundry and plumbing fixtures by the subsequent slow formation of ferric iron to the aggravation of health problems in susceptible individuals. In such cases it is necessary to remove the iron from the water prior to distribution to the end-user if the aforementioned problems are to be avoided. This may be accomplished by oxidizing the ferrous iron to ferric iron at a pH greater than 5, and removing the precipitated ferric iron by filtration. In other liquid streams, such as those used to recover copper and uranium by leaching techniques, the presence of ferrous iron above a certain concentration can reduce the efficiency of metal extraction during the leaching process. The oxidation of ferrous iron in these applications is even more demanding since the low pH of the hydrometallurgical solutions, typically less than pH 5, strongly inhibits the oxidation reaction.

Past practices for the oxidation of ferrous iron in the aforesaid applications have relied either on the direct chemical oxidation of ferrous iron by the use of oxidants, such as chlorate or permanganate, or the use of materials, such as activated carbon, which are capable of catalyzing the oxidation of ferrous iron in the presence of oxygen. The oxidation of ferrous iron by means of chemical oxidants is often expensive and inconvenient, and usually requires continuous oxidant addition and monitoring of oxidant dose rates as a function of metal concentration. Moreover, the oxidants used are often expensive and toxic per se. If present in excess, they may present secondary health or environmental concerns. Even if present in stoichiometric amounts, the products of their reduction can also be toxic or can accumulate to unacceptable levels upon the repeated cycling of the liquid media containing them. In contrast to the use of chemical oxidants, the catalytic oxidation of ferrous iron by oxygen in the presence of activated carbon is inherently more convenient, since it requires only the addition of oxygen which can be cheaply, safely, and conveniently supplied in the form of air. For these reasons the use of activated carbon may be preferred practice if it can be made to be economically viable.

Although certain activated carbons have long been known for their ability to catalytically oxidize ferrous iron into ferric iron, the rate and extent to which such carbons can effect this conversion has often not been sufficient to allow their widespread use per se in such applications. In fact, some carbons are virtually inactive catalytically in those regions of low pH where ferrous iron is relatively stable to oxygen. To obtain satisfactory performance in applications that have commercial significance, it has usually been necessary to treat the carbons further to impart certain properties which enhance their ability to catalyze the oxidation reaction.

Some of these carbon treatments have involved the impregnation of an activated carbon with a metal which will catalyze the oxidation of ferrous iron. In such cases the carbon acts primarily as a support for the metal catalyst and does not contribute directly to the catalysis. For example, Lisitsyn et at. (React. Kinet. Catal. Lett. 49(1), 119 (1993)) have described the use of platinum catalysts impregnated on activated carbon to enhance the oxidation of ferrous iron by oxygen. However, the use of platinum is prohibitively expensive in many applications. Moreover, the presence of metals on the carbon invariably increases the inherent toxic hazard of the carbon and may present disposal problems when the carbon reaches the end of its usefulness. For metal impregnants other than the platinum group metals, there is also the potential of metal dissolution and leaching when used in low pH applications.

In other carbon treatments, properties are imparted into the activated carbon itself to enhance its ability to catalyze the oxidation of ferrous iron. For example, Culligan Corporation has described a process whereby activated carbon is treated with hypochlorite solution under ambient conditions to enhance its effectiveness for the oxidation and removal of ferrous iron from potable water streams (U.S. Pat. No. 4,534,867). Other post-treatments of activated carbon have involved the exposure of activated carbon to nitrogen-containing compounds at high temperatures. For example, Naito et at. (Nippon Kagaku Kaishi 4, 467 (1979)) have described a process whereby activated carbon is coated with a nitrogen-containing compound such as hexamine, ammonium chloride, urea, or melamine, and then calcined at high temperatures, typically 900° C. The amount of nitrogen-containing compound employed is typically high, e.g. 20 wt % versus the weight of activated carbon. Treatment of an activated carbon with ammonia at high temperatures has also been found to be effective in enhancing the ability of an activated carbon to oxidize ferrous iron.

In a recent Russian patent (SU 1560592 A1), Konopleva et at. have described a process wherein a nitrogen-containing SKN- or SKAN-type carbon is used to enhance the oxidation of ferrous iron. Activated carbons of this type are typically produced by carbonizing and activating a nitrogen-rich synthetic polymer. For example, a vinyl-pyridine resin is used to produce SKN-type activated carbons (cf. I.A. Tarkovskaya et at., Soviet Progress in Chemistry 49, 18 (1983)), while SKAN-type activated carbons are produced from an acrylonitrile-divinylbenzene resin (V.A. Platonov et al., Khim. Tekhnol. (Kiev) 6, 56 (1991)).

Although reasonably effective in enhancing the ability of an activated carbon to catalyze the oxidation of ferrous iron, all of the prior art carbon-based processes have certain disadvantages which limit their overall economic utility. For example, the use of a synthetic nitrogen-containing resin or polymer as a starting material is inherently expensive, and invariably involves the generation of large amounts of hazardous cyanides during carbonization and activation. Activated carbons produced from cheaper, naturally-occurring, nitrogen-poor feedstocks do not have the catalytic activity necessary for the broad range of conditions often found in iron removal applications, low pH conditions in particular. Where such activated carbons have been post-treated at high temperatures with nitrogen-containing compounds to improve their catalytic activity, the processes employed for their beneficiation have been inherently expensive and hazardous, yielding products of variable quality and marginal economic utility. Such processes are expensive because they employ a finished high-temperature char, such as an activated carbon, as the primary feedstock. Such feedstocks are relatively inert chemically and require large quantities of reagents, high carbon losses, and/or significant departures from standard activated carbon production practices to effect significant gains in the catalytic activity of the final product. Additionally, these processes can be hazardous because they often employ hazardous reagents, such as caustic hypochlorite, or generate significant amounts of toxic byproducts, such as cyanide or nitrogen oxides, during processing.

Accordingly, it is the object of the present invention to provide a process for the oxidation of ferrous iron in liquid media which is economical, convenient, effective, and environmentally satisfactory. It is further the object of the present invention to employ a carbon for this process which is made directly from an inexpensive and abundant nitrogen-poor starting material, such as a bituminous coal, and to limit the use of agents responsible for imparting the catalytic properties to the starting material by performing the essential treatment steps during the transition of the starting material into the final product. It is a further object of the invention to utilize carbon treatment steps which include low-temperature carbonization and oxidation of the starting material, preferably by inexpensive, abundant, and relatively non-toxic oxidants, and exposure of the carbonized, oxidized, low-temperature char to small amounts of inexpensive, abundant and relatively non-toxic nitrogen-containing compounds before or during, but not after, the initial calcination and condensation of the carbon structure. It is generally the object of the invention to provide carbon treatments that are highly compatible with current processes for manufacturing activated carbons, and can be carried out with minimal departures from conventional practice.

SUMMARY OF THE INVENTION

Generally, the present invention comprises a process for the oxidation of ferrous iron in liquid media by contacting said ferrous iron in a liquid media with a catalytically-active carbonaceous char in the presence of an oxidizing agent such as oxygen. Such chars are prepared by the low-temperature carbonization and extensive oxidation of a naturally-occurring, nitrogen-poor carbon feedstock. The carbonized, oxidized char is then contacted with a nitrogen-containing compound having at least one nitrogen functionality in which the nitrogen exhibits a formal oxidation number less than that of elemental nitrogen. During or after contacting with a nitrogen-containing compound, the temperature is increased to at least 700° C. This process imparts catalytic activity to the carbon structure at minimal expense and hazard as part of a conventional process for manufacturing an activated carbon and not as a post-treatment step. All other known art methods for the preparation of nitrogen-treated carbons for ferrous iron oxidation utilize either high-value synthetic organic compounds or finished high-temperature carbonaceous chars, such as charcoal or activated carbon, as starting materials.

In all cases, high-temperature carbonaceous chars are those produced by thermal treatment at temperatures equal to or greater than 700° C. Low-temperature carbonaceous chars are those which have not experienced temperatures greater than 700° C. The sequence of treatment steps in the present invention is important in that subjecting the low-temperature carbonized, oxidized char to nitrogen-containing compounds occurs before or during, not after, its transformation into a high-temperature char, but after, not before, its low-temperature carbonization and oxidation, allowing minimal use of such nitrogen-containing compounds. Safety, environmental, and economic costs are thereby greatly minimized. At the same time, the development of the catalytic properties of the char and the compatibility of the process with conventional processes for the manufacture of high-temperature chars from such starting materials are optimized. Post-treatment processes are entirely eliminated since the desired product is produced directly from the starting material.

The preferred nitrogen-poor carbon feedstock is a bituminous coal or a carbonaceous material such as those derived from higher or lower rank bitumens, coals, or lignocellulose materials by various chemical treatments (hereinafter collectively referred to as "bituminous material"). Examples of higher rank coals include anthracite or semi-anthracite coals, while examples of lower rank .:oats include peat, lignite, and sub-bituminous coals. Examples of the chemical treatment of these feedstocks include alkali metal treatment of the high rank materials and zinc chloride or phosphoric acid treatment of the low rank materials. These types of treatments can also be applied to lignocellulose materials.

In a preferred embodiment of this invention, the feedstock material is pulverized, mixed if necessary with small amounts of a suitable binder such as pitch, briquetted or otherwise formed, and sized. The sized material is then carbonized and extensively oxidized at temperatures less than 700° C., preferably less than 400° C. The oxidation is continued until additional gains in the catalytic activity of the final product are no longer evident. The oxidation is well beyond that typically required to remove the coking properties of bituminous coals and produces an optimally oxidized char. Other convenient means of oxidation can also be used to effect the low-temperature oxidation and carbonization of the starting material.

The carbonized, oxidized low-temperature carbonaceous char is then exposed to small amounts of an inexpensive, abundant, and relatively non-toxic nitrogen-containing compound such as urea before or during, not after, the initial calcination and condensation of the carbon structure. The mounts of nitrogen-containing compounds used are typically small, preferably less than 5% by weight of the carbonized, oxidized low-temperature carbonaceous char or such that additional gains in the catalytic activity of the final product are no longer evident. The treatment is carried out by heating the carbonized, oxidized low-temperature char to high temperatures, preferably between 850° C. and 950° C., in the presence of the nitrogen-containing compound. This heating is preferably conducted under an atmosphere that is inert except for the gases and vapors attributable to the char and/or the nitrogen-containing compound. The heating rates and temperatures are preferably selected such that additional gains in the catalytic activity of the final product are no longer evident.

The nitrogen-treated high-temperature carbonaceous char may then be activated to the desired density at temperatures above 700° C. in steam and/or carbon dioxide, with or without the addition of other gasifying agents such as air. The calcined or calcined/activated carbonaceous char is then cooled in an oxygen-free or otherwise inert atmosphere to temperatures less than 400° C., preferably less than 200° C. Additional gains in catalytic activity may be realized by repeating oxidation/exposure to nitrogen-containing compounds/calcination or calcination/activation/inert cooling as many times as may be desired. Alternatively, any other method known to generate catalytic activity in high temperature carbonaceous chars may be applied to the resultant product to further enhance its catalytic activity.

The carbonaceous char prepared according to the above method is then contacted, in the presence of oxygen, with the liquid media containing the ferrous iron.

PRESENTLY PREFERRED EMBODIMENTS

The following examples illustrate the practice of the invention. Example 1 provides a representation of a preferred embodiment of the invention. Example 2 provides a representation of the prior art. Comparison of the results of Example 1 to those of Example 2 shows the beneficial effects of the present invention when compared to the prior art.

EXAMPLE 1

Bituminous coal was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4 hours, and finally heated from 350° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce an approximately 4% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was activated with steam for approximately 15 minutes at about 950° C. After activation, the material was cooled to ambient temperature under an inert gas atmosphere. This slightly activated carbon was then heated to 450° C. and maintained at this temperature for 120 minutes in the presence of air. The carbon that resulted from this treatment was then cooled to near ambient temperatures in a low oxygen-content atmosphere and subsequently impregnated with an aqueous urea solution and dried. The quantity of urea solution used was sufficient to produce a 4% urea loading on a dry weight basis. After impregnation, a portion of the impregnated, mildly activated carbon was rapidly heated to 950° C. under an inert atmosphere and maintained at that temperature for 1 hour. Immediately following this calcination treatment, the resultant material was activated with steam at 950° C. such that the Apparent Density Crest Method TM-7, Calgon Carbon Corporation, Pittsburgh, Pa.) of the final product, after cooling to ambient temperature under an inert gas atmosphere and sizing to less than 4 mesh and greater than 6 mesh (U.S. Standard Series Sieves), was 0.483 grams per cc.

The ability of the resultant carbon to catalyze the oxidation of ferrous iron was determined by adding a 50 milligram (mg) portion of this carbon, pulverized such that at least 95% by weight of the carbon was less than 325 mesh (U.S. Standard Series Sieves), to 150 milliliters (mL) of a 0.1N sulfuric acid solution containing approximately 1000 milligrams per liter (mg/L) of ferrous iron added to the solution as ferrous sulfate heptahydrate. The ferrous solution and carbon were contained in a 250 mL Erlenmeyer flask open to the atmosphere under ambient conditions and stirred with a one-inch teflon-covered magnetic stir bar such that a vortex of approximately one-half inch was maintained at all times. A second 250 mL Erlenmeyer flask containing 150 mL of the said 1000 mg/L ferrous solution only (no carbon) was maintained separately under the same conditions to show the extent of ferrous oxidation in the absence of the carbon. After stirring for 72 hours, the contents of each flask were filtered. To 10 mL portions of each filtrate, 10 mL of concentrated phosphoric acid and 3 drops of Ferroin indicator were added and then titrated against standard 0.01N ceric solution. For the flask containing no carbon, 20.5 mL of titrant were required to reach an endpoint. For the flask containing the carbon, 0.7 mL of titrant were required to reach an endpoint, indicating that approximately 96% of the ferrous iron had been oxidized when compared to the extent of oxidation in the absence of the carbon.

EXAMPLE 2

A portion of Witcarb 965 (Witco Chemical Corporation, New York, N.Y.), an activated carbon derived from petroleum coke, was pulverized such that at least 95% by weight of the carbon was less than 325 mesh (U.S. Standard Series Sieves). A 50 mg portion of this carbon was then added to 150 mL of a 0.1N sulfufic acid solution containing approximately 1000 mg/L of ferrous iron added to the solution as ferrous surfate heptahydrate. The ferrous solution and carbon were contained in a 250 mL Erlenmeyer flask, open to the atmosphere under ambient conditions and stirred with a one-inch teflon-covered magnetic stir bar such that a vortex of approximately one-half inch was maintained at all times. A second 250 mL Erlenmeyer flask containing 150 mL of the said 1000 mg/L ferrous solution only (no carbon) was maintained separately under the same conditions to show the extent of ferrous oxidation in the absence of the carbon. After stirring for 72 hours, the contents of each flask were filtered. To 10 mL portions of each filtrate, 10 mL of concentrated phosphoric acid and 3 drops of Ferroin indicator were added and then titrated against standard 0.01N ceric solution. For the flask containing no carbon, 20.5 mL of titrant were required to reach an endpoint. For the flask containing the carbon, 19.9 mL of titrant were required to reach an endpoint, indicating that approximately 3% of the ferrous iron had been oxidized when compared to the extent of oxidation in the absence of the carbon.

While presently preferred embodiments of the invention have been described in particularity, it may be otherwise embodied within the scope of the appended claims.

What is claimed is:

1. A process for the oxidation of ferrous iron comprising contacting liquid media containing ferrous iron with a carbonaceous char in the presence of an oxidizing agent, said char being prepared by:
   (a) carbonizing a bituminous coal or a bituminous material at temperatures below 700° C. in the presence of an oxidant;
   (b) oxidizing said bituminous coal or bituminous material at temperatures below 700° C. during or after said carbonization; and
   (c) contacting said carbonized and oxidized bituminous coal or bituminous material at temperatures less than 700° C. with a nitrogen-containing compound, said nitrogen-containing compound having at least one nitrogen functionality in which the nitrogen exhibits a formal oxidation number less than that of elemental nitrogen, and, during or after said contacting with a nitrogen-containing compound, increasing the temperature to at least 700° C.

2. A process as set forth in claim 1 wherein the said carbonaceous char has been activated at temperatures above 700° C. using at least one of $H_2O$, $CO_2$, and $O_2$.

3. A process as set forth in claim 1 wherein the said nitrogen-containing compound is selected from the group ammonia, urea, melamine and derivatives thereof.

4. A process as set forth in claim 1 wherein the said oxidizing agent is oxygen.

5. A process as set forth in claim 1 wherein the char is one of granular, pellets, shaped, or powdered.

6. A process as set forth in claim 2 wherein the char is one of granular, pellets, shaped, or powdered.

* * * * *